(12) United States Patent
Ye et al.

(10) Patent No.: US 10,955,061 B2
(45) Date of Patent: Mar. 23, 2021

(54) SWITCH BLADE TYPE WATER FLOWING STRUCTURE

(71) Applicant: NINGBO DAYE GARDEN INDUSTRY CO., LTD, Zhejiang (CN)

(72) Inventors: Xiaodong Ye, Zhejiang (CN); Fei Gong, Zhejiang (CN)

(73) Assignee: NINGBO DAYE GARDEN INDUSTRY CO., LTD., Zhejiang (CN)

( * ) Notice: Subject to any disclaimer, the term of this patent is extended or adjusted under 35 U.S.C. 154(b) by 0 days.

(21) Appl. No.: 16/538,458

(22) Filed: Aug. 12, 2019

(65) Prior Publication Data
US 2020/0271233 A1    Aug. 27, 2020

(30) Foreign Application Priority Data
Feb. 27, 2019    (CN) .......................... 201920244620.8

(51) Int. Cl.
*F16K 11/22* (2006.01)
*A01G 25/16* (2006.01)

(52) U.S. Cl.
CPC .............. *F16K 11/22* (2013.01); *A01G 25/16* (2013.01)

(58) Field of Classification Search
USPC ................................................ 137/883, 887
See application file for complete search history.

(56) References Cited

U.S. PATENT DOCUMENTS

| 2,117,456 | A | * | 5/1938 | Schellin | ................ | F16K 5/0689 |
| | | | | | | 251/315.06 |
| 6,058,975 | A | * | 5/2000 | Hui-Chen | ............... | F16K 11/20 |
| | | | | | | 137/271 |

* cited by examiner

*Primary Examiner* — John Fox
(74) *Attorney, Agent, or Firm* — Ladas & Parry, LLP

(57) ABSTRACT

A switch blade type water flowing structure is provided. The switch blade type water flowing structure comprises a main body, a main water channel, a water inlet, water outlets, water flowing switches and the like, each water flowing switch comprises a switch seat, a switch piece and the like, wherein each switch seat is positioned and plugged in the corresponding water outlet in a sealed manner in the axial direction of the corresponding water outlet, and each switch piece is positioned on one side of the corresponding switch seat and is rotatably mounted in the corresponding switch seat in a sealed manner in the radial direction of the switch seat; meanwhile, each switch piece is provided with a pulling arm extending to the outside of the corresponding switch seat in an integrated manner, and each pulling arm is provided with a pulling piece extending out and being exposed on the outer surface of the corresponding water outlet.

9 Claims, 10 Drawing Sheets

SWITCH BLADE TYPE WATER FLOWING STRUCTURE

BACKGROUND

Technical Field

The present application relates to a four-way water flowing structure, in particular to a novel switch blade type four-way water flowing structure.

Related Art

A four-way water flowing structure is a four-way water flowing product which is commonly used in water distribution of irrigation for landscaping, and mainly consists of a main body, a main water channel arranged in the main body, as well as a water inlet and water outlets which are arranged outside the main body and communicates with the main water channel, and the like. Generally, only one water inlet is required, but a plurality of water outlets is required according to the requirement of water distribution, a water flowing switch is arranged in each water outlet, and can be used for independently controlling water flow switch-on and switch-off or flow adjustment of the corresponding water outlet. However, water flowing switches of an existing four-way water flowing structure are mainly operated and controlled by a knob rotating mode or a shifting block shifting mode, and the shortcomings of laboriousness in operation, inconvenience in shifting, poor operation state recognition degree and the like always exist. Therefore, with continuous expanding of irrigation markets for landscaping, many users also urgently hope that manufacturers are able to produce more four-way water flowing structures with different structures and operation modes to meet market demands.

SUMMARY

The present application aims to provide a novel switch blade type four-way water flowing structure which is labor-saving in operation, convenient to pull and high in operation state recognition degree so as to overcome shortcomings in the prior art.

The technical problems of the present application are solved through the following technical scheme:

a novel switch blade type four-way water flowing structure includes a main body, a main water channel arranged in the main body, as well as a water inlet and a plurality of water outlets which are arranged outside the main body and communicates with the main water channel, a water flowing switch is arranged in each water outlet, each water flowing switch includes a switch seat which is positioned and plugged in the corresponding water outlet in a sealed manner in the axial direction of the corresponding water outlet, and one side of each switch seat is provided with a switch piece which is rotatably mounted in the switch seat in a sealed manner in the radial direction of the switch seat; each switch piece is provided with a pulling arm extending out of the corresponding switch seat in an integrated manner, and a pulling piece extending out and being exposed on the outer surface of the corresponding water outlet is arranged on each pulling arm; and each pulling piece carries out front-back reciprocating pulling along the shaft axis of the corresponding water outlet, and drives the corresponding switch piece to forwards and reversely rotate in the corresponding switch seat to open and close the corresponding water outlet in a sealed manner or adjust the flow of the corresponding water outlet.

A water outlet channel penetrating through in the axial direction is formed in each switch seat, the inner end of each water outlet channel communicates with the main water channel, the outer end of each water outlet channel communicates to the outside of the corresponding water outlet, the shaft axis of each water outlet channel is superposed to the shaft axis of the corresponding water outlet, and the rotating shaft axis of each switch piece is perpendicular to the shaft axis of the corresponding water outlet channel.

Each switch piece consists of a rotating head at the inner end, a pulling head at the outer end and a mandrel connected between the rotating head and the pulling head, and a sealing gasket being fixedly mounted is arranged on one side of each mandrel; a sealing ring is arranged on the outer circumferential surface of each rotating head, a release stopping barb is arranged on the outer end surface of each rotating head; a sealing ring is arranged on the outer circumferential surface of each pulling head; and each pulling arm extends out of the corresponding switch seat in an integrated manner from the outer end surface of the corresponding pulling head, and is parallel to the rotating shaft axis of the corresponding switch piece.

A mounting hole penetrating through the corresponding water outlet channel in the radial direction is formed in one side of each switch seat, each switch piece is rotatably mounted in the corresponding mounting hole in a sealed manner, and each release stopping barb on the outer end surface of each rotating head is rotatably mounted in a release stopping manner; and the sealing ring on the outer circumferential surface of each rotating head and the sealing ring on the outer circumferential surface of each pulling head are in contact with the inner wall of the opening of the corresponding mounting hole in a dynamic sealing manner, a water outlet hole is formed in a position where each mounting hole is connected with the corresponding water outlet channel, and each sealing gasket is pulled by the corresponding switch piece in a reciprocating manner to rotate so as to realize sealing opening and closing or flow adjustment with the corresponding water outlet hole.

The outer surface of each water outlet is provided with a pulling groove extending in the axial direction of the water outlet, and each pulling piece extends out of the corresponding pulling groove to be exposed.

The inner end of each switch seat is mounted in the neck hole of the corresponding water outlet in a sealed manner, an outer joint being mounted in a sealed manner is arranged at the outer end of each switch seat, and each outer joint is connected to the inside of the corresponding water outlet and seals the corresponding switch seat in the corresponding water outlet.

The outer surface of each switch seat is provided with a limiting rib as well as a positioning groove and a guiding groove penetrating through in the axial direction, and a limiting inclined plane cooperated with the limiting rib to implement installation limiting of the corresponding switch seat, a positioning rib cooperated with the corresponding positioning groove to implement installation positioning of the corresponding switch seat and a guiding rib cooperated with the corresponding guiding groove to implement installation guiding of the corresponding switch seat are arranged on the inner wall of each water outlet.

A water inlet plug is inserted in the water inlet in a sealed manner, a filter screen water stopping ring and a loose joint nut are arranged at the outer end of the water inlet plug, and a nut jacket wraps the outside of the loose joint nut.

The main body is a straight tube penetrating through in the axial direction, and a water stopping ring and an end cover are respectively arranged at the two ends of the straight tube for sealing.

Each pulling piece is detachably connected with the corresponding pulling arm in a threaded manner.

Compared with the prior art, the present application mainly modifies the water flowing switches in the four-way water flowing structure, and each water flowing switch includes a switch seat being positioned and plugged in the corresponding water outlet in a sealed manner in the axial direction of the corresponding water outlet, a switch piece positioned on one side of the switch seat and being rotatably mounted in the switch seat in a sealed manner in the radial direction of the switch seat, and the like; meanwhile, each pulling arm extending out of the corresponding switch seat in an integrated manner is arranged on the corresponding switch piece, and each pulling piece extending out and being exposed on the outer surface of the corresponding water outlet is further arranged on the corresponding pulling arm; and during working, the pulling pieces only need to be operated to carry out front-back reciprocating pulling along the shaft axes of the water outlets, then the switch pieces can be driven to synchronously rotate forwards and reversely in the switch seats, and therefore, sealing opening and closing or flow adjustment of the water outlets are realized. In the modified water flowing switches, a switch blade type pulling operation mode creatively replaces a traditional rotating mode or shifting mode, thus, the advantages of labor saving in operation, convenience in pulling and the like are achieved, further, a user can master an operation state well, and the operation state recognition degree of the four-way water flowing structure is greatly increased.

DETAILED DESCRIPTION

Hereinafter, embodiments of the present application will be described in detail with reference to the above-mentioned drawings.

As shown in FIG. 1 to FIG. 10, 1 represents main body, 11 represents main water channel, 12 represents water stopping ring, 13 represents end cover, 2 represents water inlet, 21 represents water inlet plug, 211 represents ring slot, 22 represents filter screen water stopping ring, 23 represents loose joint nut, 24 represents nut jacket, 25 represents latch, 26 represents set screw, 3 represents water outlet, 31 represents positioning rib, 32 represents limiting inclined plane, 33 represents guiding rib, 34 represents pulling groove, 4 represents water flowing switch, 41 represents switch seat, 411 represents water outlet channel, 412 represents water outlet hole, 413 represents mounting hole, 414 represents limiting rib, 415 represents positioning groove, 416 represents baffle plate, 417 represents guiding groove, 42 represents switch piece, 421 represents rotating head, 422 represents pulling head, 423 represents mandrel, 424 represents release stopping barb, 425 represents pulling arm, 43 represents outer joint, 44 represents sealing gasket, 45 represents pulling piece and 5 represents double sealing ring.

Disclosed is a novel switch blade type four-way water flowing structure, as shown in FIG. 1 to FIG. 4, a four-way water flowing product for water distribution of irrigation for landscaping is mainly involved, and the novel switch blade type four-way water flowing structure includes a main body 1, a main water channel 11 arranged in the main body, as well as a water inlet 2 and a plurality of water outlets 3 which are arranged outside the main body 1 and communicates with the main water channel 11, and the like.

Figure 8:
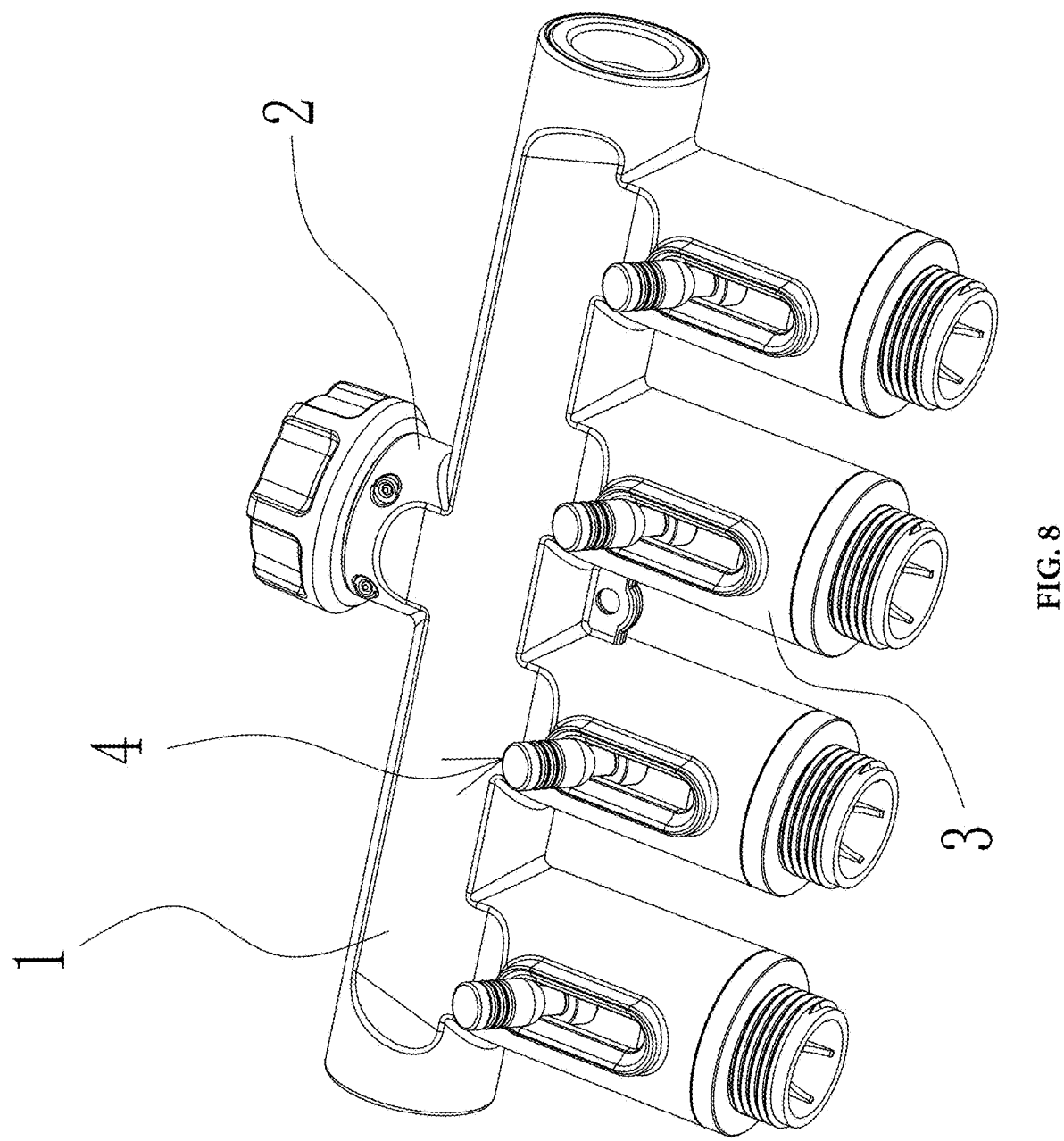
FIG. 8 is a three-dimensional view of FIG. 1.

The main body 1 is an aluminum alloy straight tube penetrating through in the axial direction, namely a straight-through round tube as shown in FIG. 8, the main water channel 11 is an axial through hole formed in the straight tube, end covers 13 with the water stopping rings 12 fixedly embedded on the outer circumferential surfaces for plugging in a sealed manner are respectively arranged at two ends of the straight tube, thus, a sealed structure is formed by the main water channel 11 in the main body 1, the water stopping rings 12 are 0-shaped sealing rings generally, and each end cover 13 can be fixed by a set screw 26 on the main body 1.

One water inlet 2 is arranged generally, and is integrally formed in the middle of one side of the main body 1, the shaft axis of the water inlet 2 is perpendicular to the shaft axis of the main water channel 11, but four water outlets 3 are arranged in the present embodiment, namely a four-way water outlet structure is formed, the four water outlets 3 are exactly formed in the other side, which is opposite to the water inlet 2, of the main body 1, every two water outlets 3 are arranged into a group, the two groups of water outlets are symmetrically arranged by taking the water inlet 2 as a center, and the shaft axes of the four water outlets 3 are parallel to one another, and are perpendicular to the shaft axis of the main water channel 11.

Figure 7:
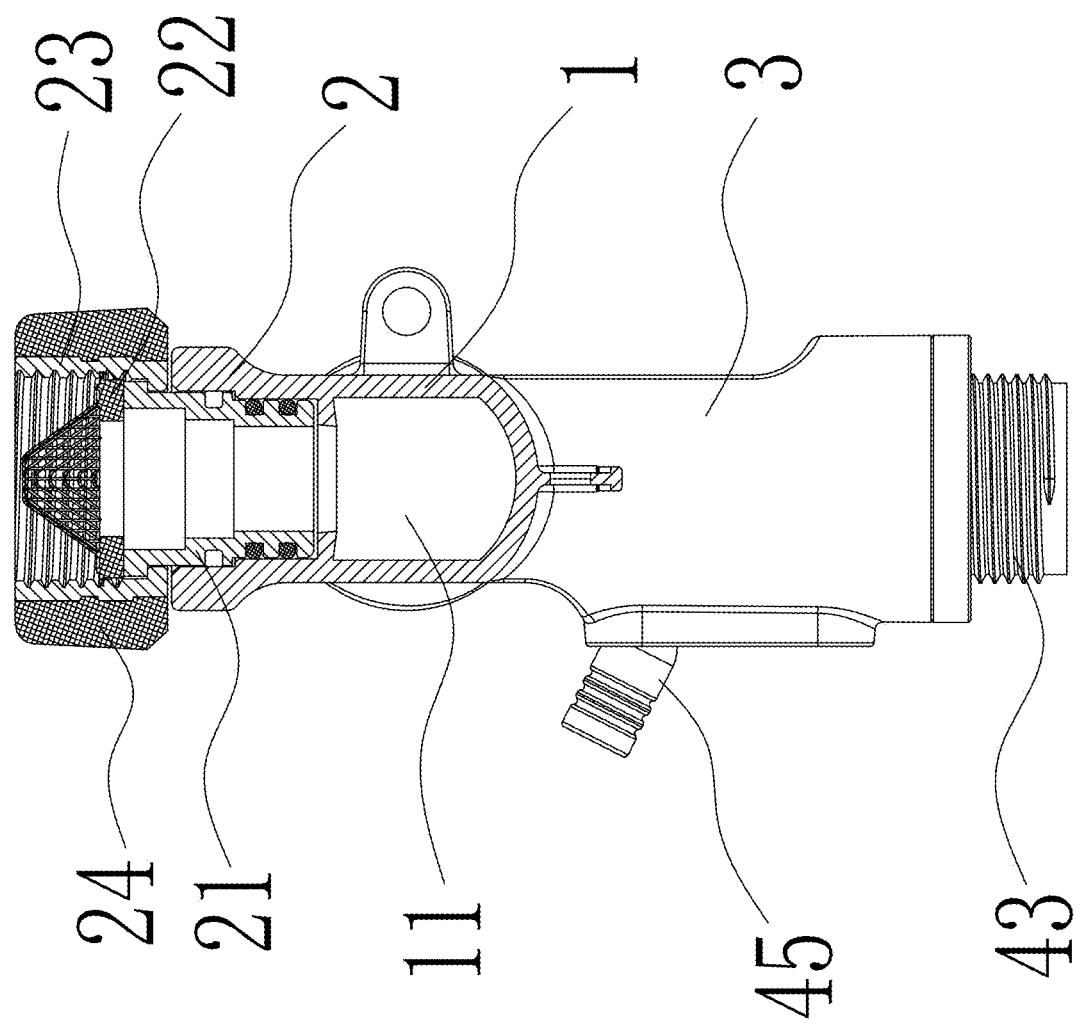
FIG. 7 is an enlarged cross-sectional view taken along the line C-C of FIG. 4.

A water inlet plug 21 is arranged in the water inlet 2, a specific structure is shown in FIG. 7: the water inlet plug 21 is inserted in the water inlet 2 in a sealed manner through a double sealing ring 5 on the outer circumferential surface of the inner end, a filter screen water stopping ring 22 and a loose joint nut 23 are arranged at the outer end of the water inlet plug 21, the water inlet plug 21 is in threaded connection with a water supply tube in a sealed manner through the loose joint nut, a nut jacket 24 wraps the outside of the loose joint nut 23, and an effect of protecting the loose joint nut 23 can be achieved.

Meanwhile, a ring slot 211 is further formed in the outer circumferential surface of the inner end of the water inlet plug 21 of the adjacent double sealing rings 5, two latches 25 penetrate through the main body 1, and are exactly inserted in the ring slot 211, an inserted limiting effect on the inner end of the water inlet plug 21 is achieved, and the situation that direction rotation adjustment on the main body 1 can be implemented after the loose joint nut 23 is mounted and fixed can also be ensured.

Figure 5:
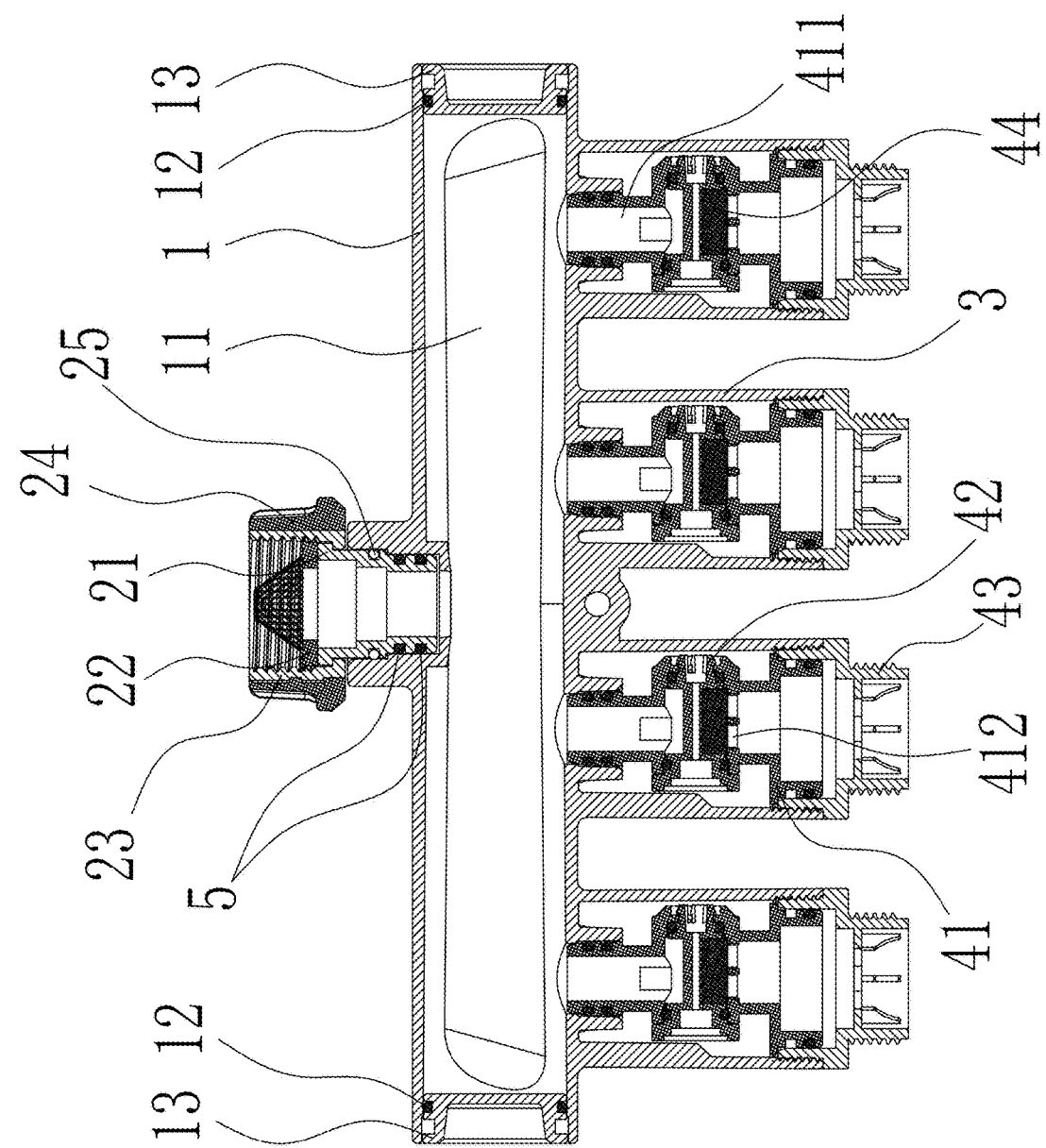
FIG. 5 is a cross-sectional view taken along the line A-A of FIG. 3.
Figure 6:
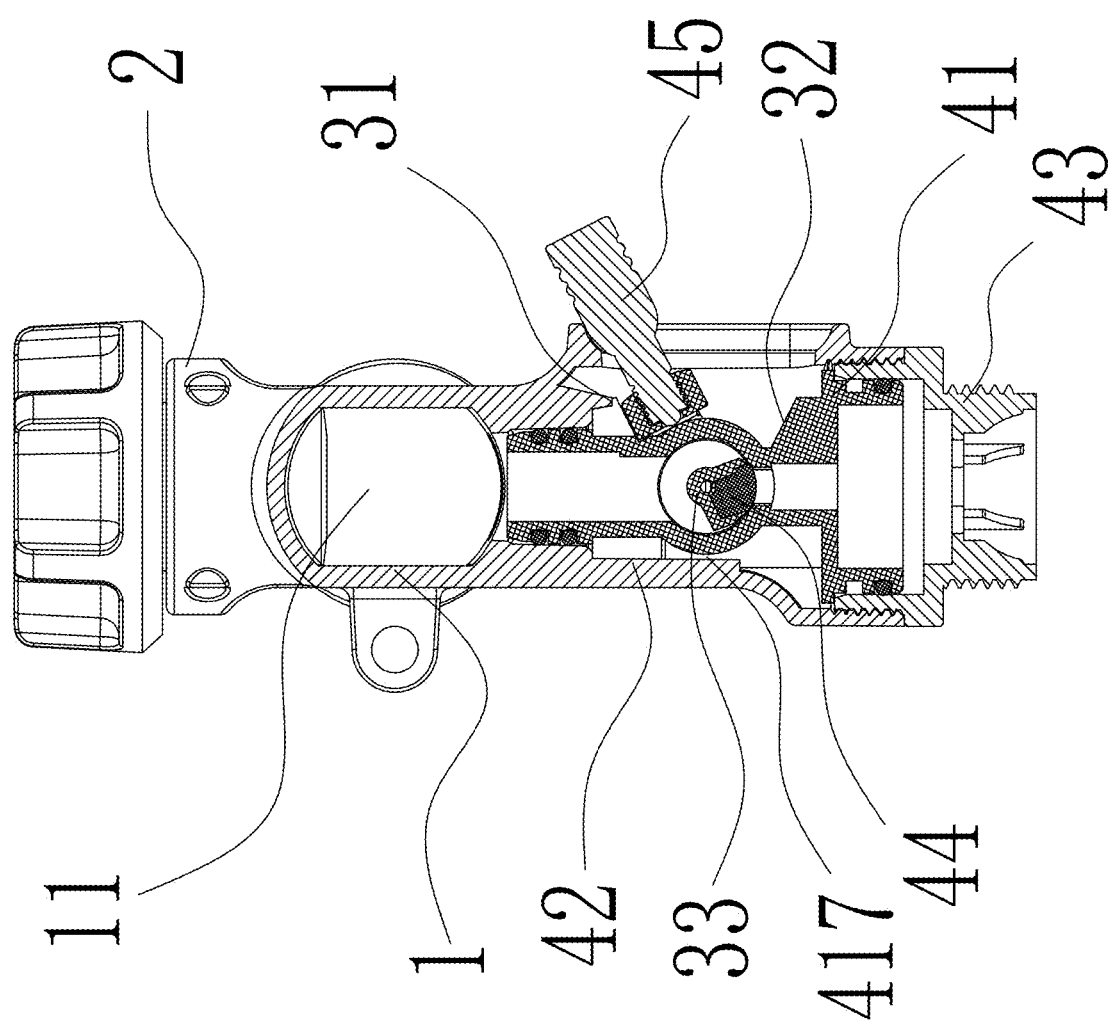
FIG. 6 is an enlarged cross-sectional view taken along the line B-B of FIG. 1.
Figure 9:
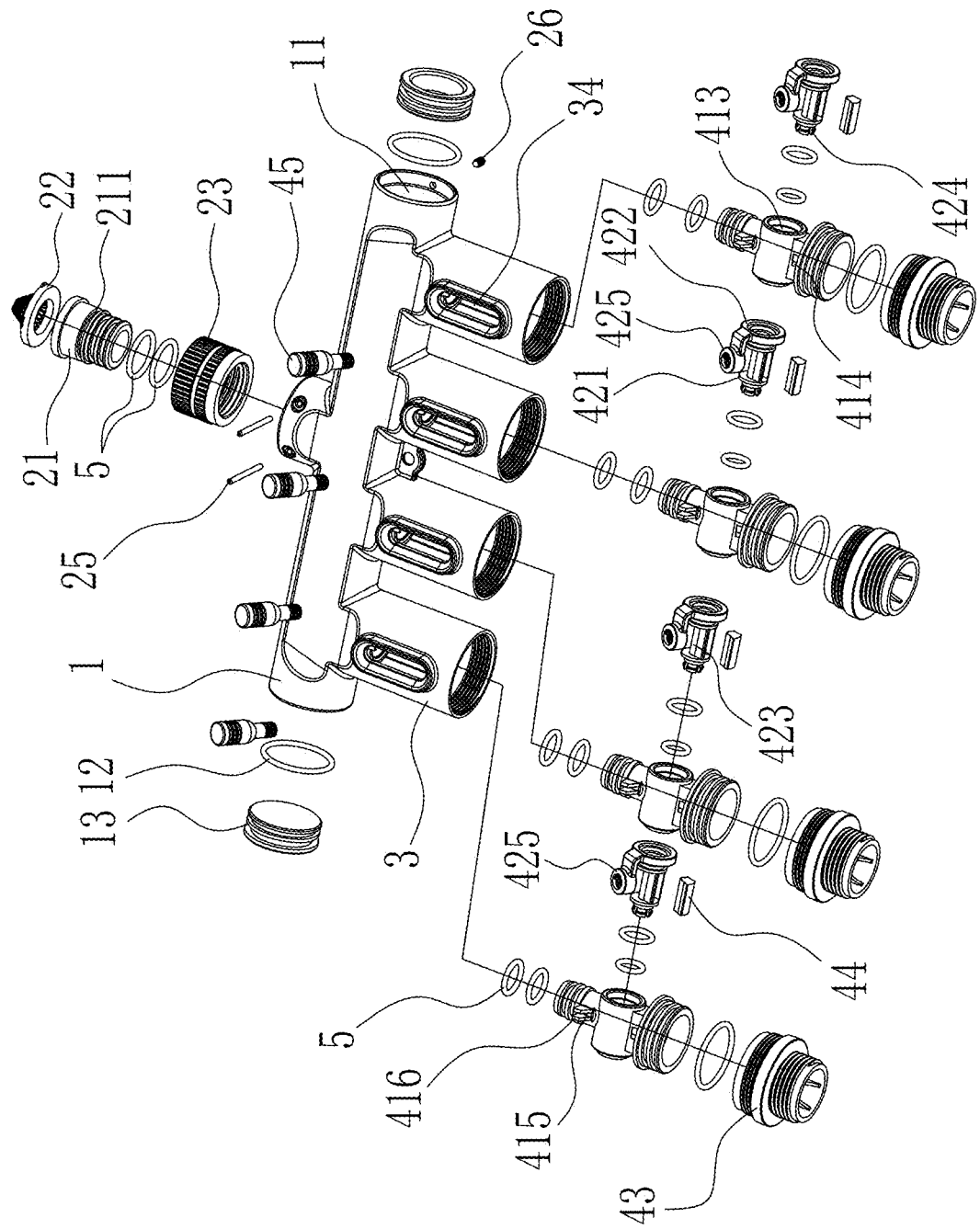
FIG. 9 is a three-dimensional exploded view of FIG. 8.
Figure 10:
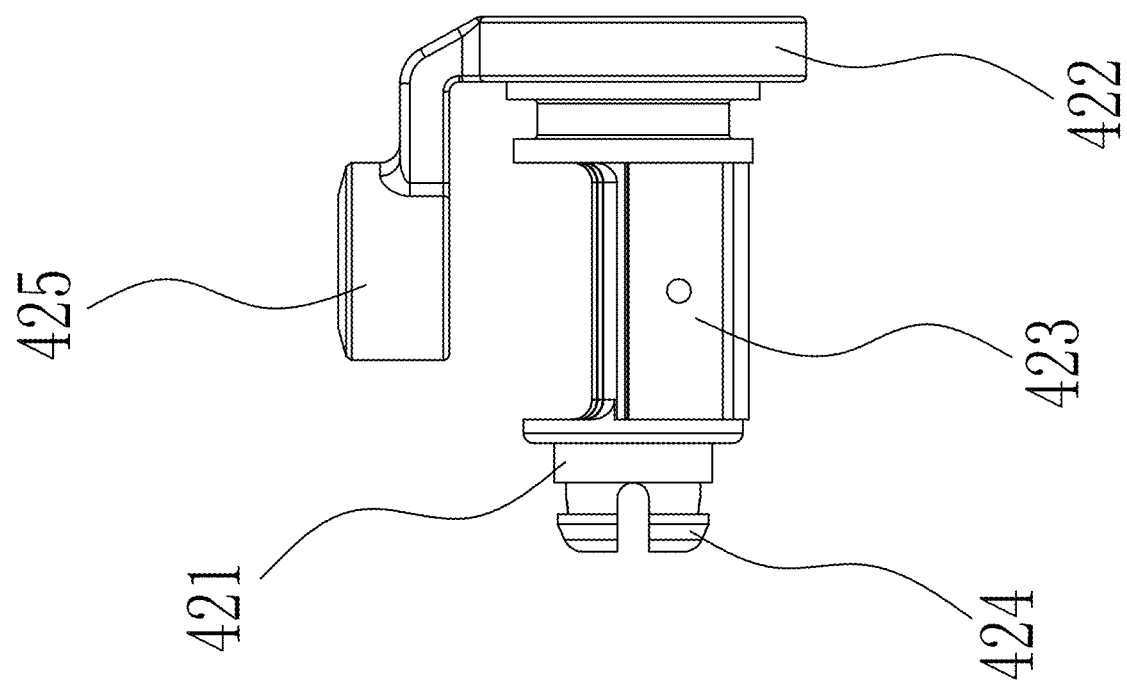
FIG. 10 is an enlarged front view of a switch piece as shown in FIG. 9.

In addition, a water flowing switch 4 which is completely the same as the structure as shown in FIG. 5 is arranged in each water outlet 3, thus, the structure of only one of the water flowing switches 4 is taken as an example to be described in detail in the present embodiment, as shown in FIG. 9, the water flowing switch includes a switch seat 41 being positioned and plugged in the corresponding water outlet in a sealed manner in the axial direction of the corresponding water outlet 3, a specific mounting structure is as shown in FIG. 9 and FIG. 10: a positioning groove 415 penetrating through in the axial direction is formed in the outer surface of the inner end of the switch seat 41, the positioning groove is formed by a space between two baffle plates 416 which are arranged on the outer surface of the inner end of the switch seat 41 in parallel, a limiting rib 414 is arranged on the outer surface of the outer end of the switch seat 41, the positioning groove 415 and the limiting rib 414 are arranged on the outer surface of the upper portion of the switch seat 41, and a guiding groove 417 penetrating through in the axial direction is formed in the outer surface of the lower portion, opposite to the upper portion, of the switch seat 41; a positioning rib 31, a limiting inclined plane 32 and a guiding rib 33, as shown in FIG. 6, are arranged on the inner wall of the water outlet correspondingly; and the positioning rib 31 can be arranged in the positioning groove 415 cooperatively to implement installation positioning of the front end of the switch seat 41, the limiting inclined plane 32 can be cooperatively abutted to the limiting rib 414 to implement installation limiting of the rear end of the switch seat 41, and the guiding rib 33 can be arranged in the guiding groove 417 cooperatively to implement installation guiding of the switch seat 41.

Then the inner end of the switch seat 41 is mounted in the neck hole of the water outlet 3 in a sealed manner through the sealing ring 5 on the outer circumferential surface, the outer end of the switch seat 41 is plugged in an outer joint 43 through the sealing ring 5 on the outer circumference to form sealed connection, the outer joint 43 is then in threaded connection to the inside of the water outlet 3, and thus, the switch seat 41 is integrally sealed in the water outlet 3.

A water outlet channel 411 penetrating through in the axial direction is formed in the switch seat 41, after the switch seat 41 is mounted in the water outlet 3, the inner end of the water outlet channel 411 will communicate with the main water channel 11, the outer end of the water outlet channel 411 directly communicates to the outside of the water outlet 3 with the aid of the outer joint 43, and the shaft axis of the water outlet channel 411 is exactly superposed to the shaft axis of the water outlet 3.

A switch piece 42 being rotatably mounted in the switch seat in a sealed manner in the radial direction of the switch seat is arranged on one side of the switch seat 41, particularly, a mounting hole 413 penetrating through the water outlet channel 411 in the radial direction is formed in one side of the switch seat 41 so that the switch piece 42 is rotatably mounted in the mounting hole 413 in a sealed manner, and the rotating shaft axis of the switch piece 42 is perpendicular to the shaft axis of the water outlet channel 411.

The switch piece 42 consists of a rotating head 421 at the inner end, a pulling head 422 at the outer end and a mandrel 423 connected between the rotating head 421 and the pulling head 422, and a rubber sealing gasket 44 being embedded and fixed is arranged on one side of the mandrel.

A sealing ring 5 is arranged on the outer circumferential surface of the rotating head 421, and a release stopping barb 424 is arranged on the outer end surface of the rotating head 421; a sealing ring 5 is arranged on the outer circumferential surface of the pulling head 422; and the pulling arm 425 extends out of the switch seat 41 in an integrated manner from the outer end surface of the pulling head 422, and is parallel to the rotating shaft axis of the switch piece 42.

A sealed rotatable mounting structure of the switch piece 42 in the mounting hole 413 is as follows: the rotating head 421 is rotatably mounted in the mounting hole 413 through the release stopping barb 424 on the outer end surface and release stoping is implemented, namely, the rotating head 421 penetrates through the mounting hole 413 and is positioned on the switch seat 41 in a reverse buckling manner, the sealing ring 5 on the outer circumferential surface of the rotating head 421 and the sealing ring 5 on the outer circumferential surface of the pulling head 422 are in contact with the inner wall of the opening of the mounting hole 413 in a dynamic sealing manner to ensure the airtightness of the switch piece 42 when the switch piece 42 rotates in the mounting hole 413, a water outlet hole 412 is further formed in a position where the mounting hole 413 is connected with the water outlet channel 411, the water outlet hole is in opening and closing fit with the sealing gasket 44, and particularly, when the switch piece 42 forwards and reversely rotates in the mounting hole 413 of the switch seat 41, the sealing gasket 44 can be driven to realize sealing opening and closing or flow adjustment with the water outlet hole 412.

The pulling arm 425 extending out of the switch seat in an integrated manner is further arranged on the outer end surface of the pulling head 422, the pulling arm is parallel to the rotating shaft axis of the switch piece 42, a threaded connecting hole is formed in the pulling arm, a pulling piece 45 being detachably connected with the threaded connecting hole in a threaded manner is further arranged on the pulling arm, and the pulling piece extends out and is exposed on the outer surface of the water outlet 3 so as to facilitate operation of the switch piece 42.

A pulling groove 34 extending in the axial direction of the water outlet is formed in the outer surface of the water outlet 3, the pulling piece 45 extends out from the pulling groove 34 to be exposed, operation of a user can be facilitated, and the operation state recognition degree is improved.

Figure 1:
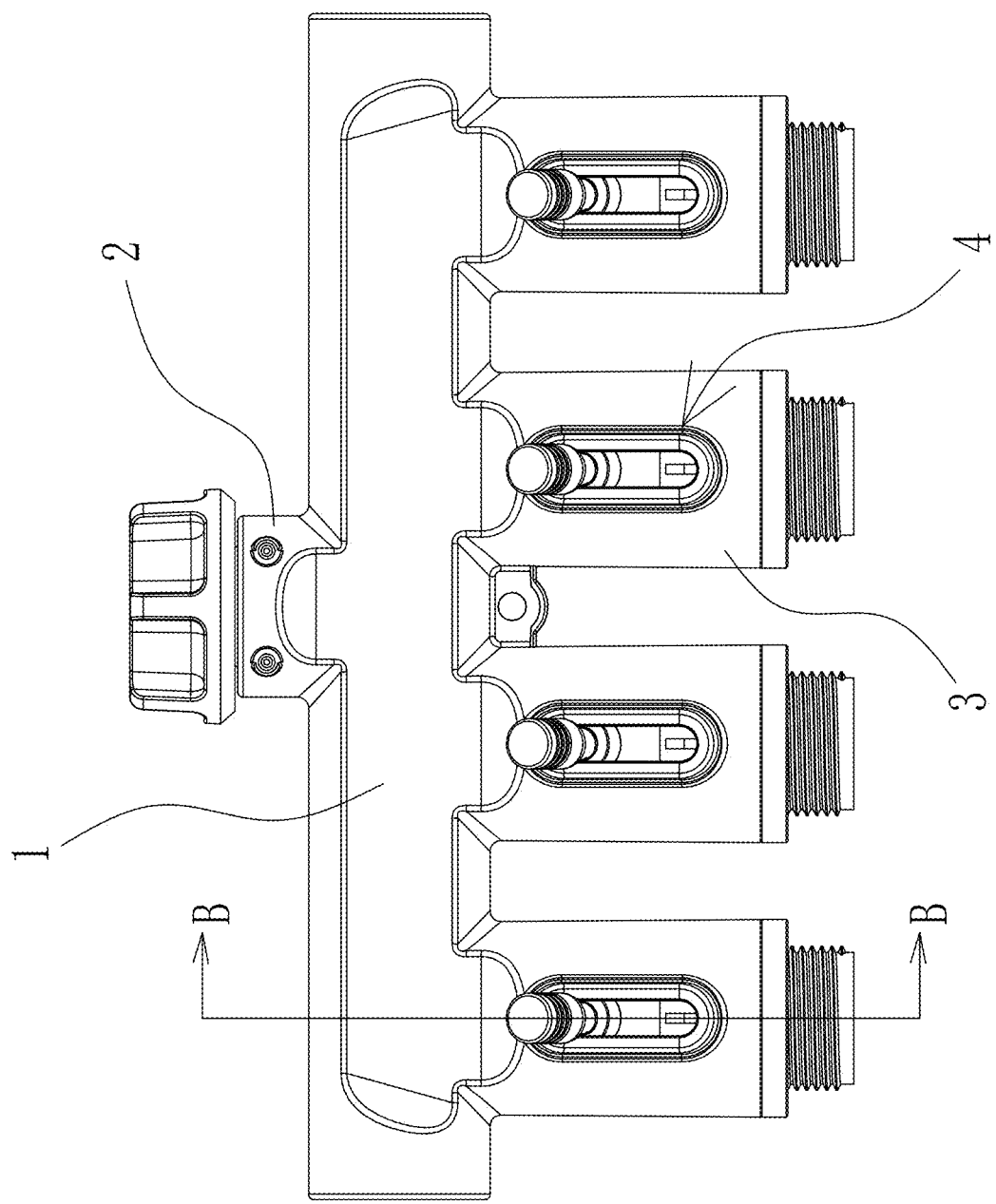
FIG. 1 is a front view of the water flowing structure of the present application.
Figure 2:
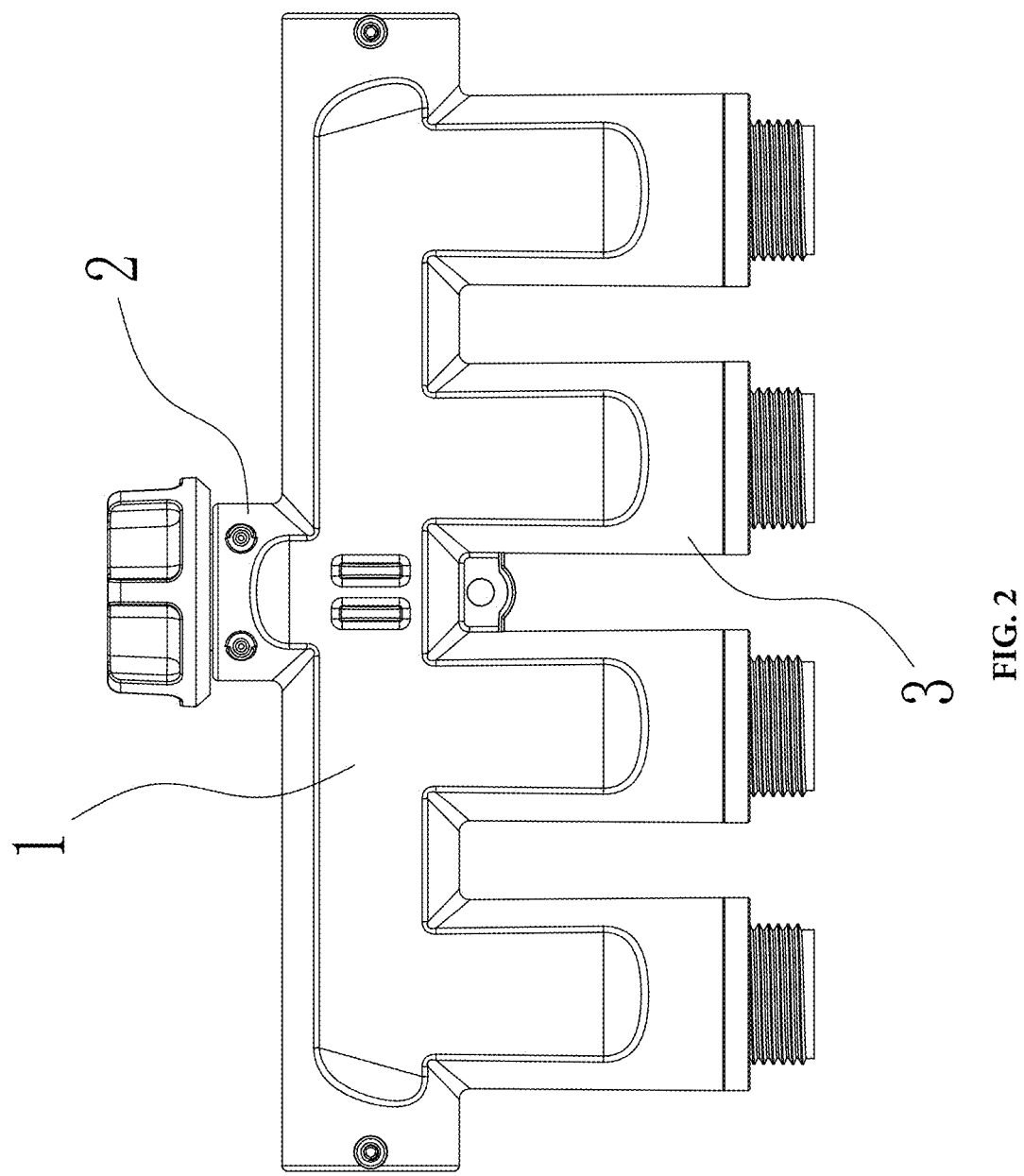
FIG. 2 is a rear view of FIG. 1.
Figure 3:
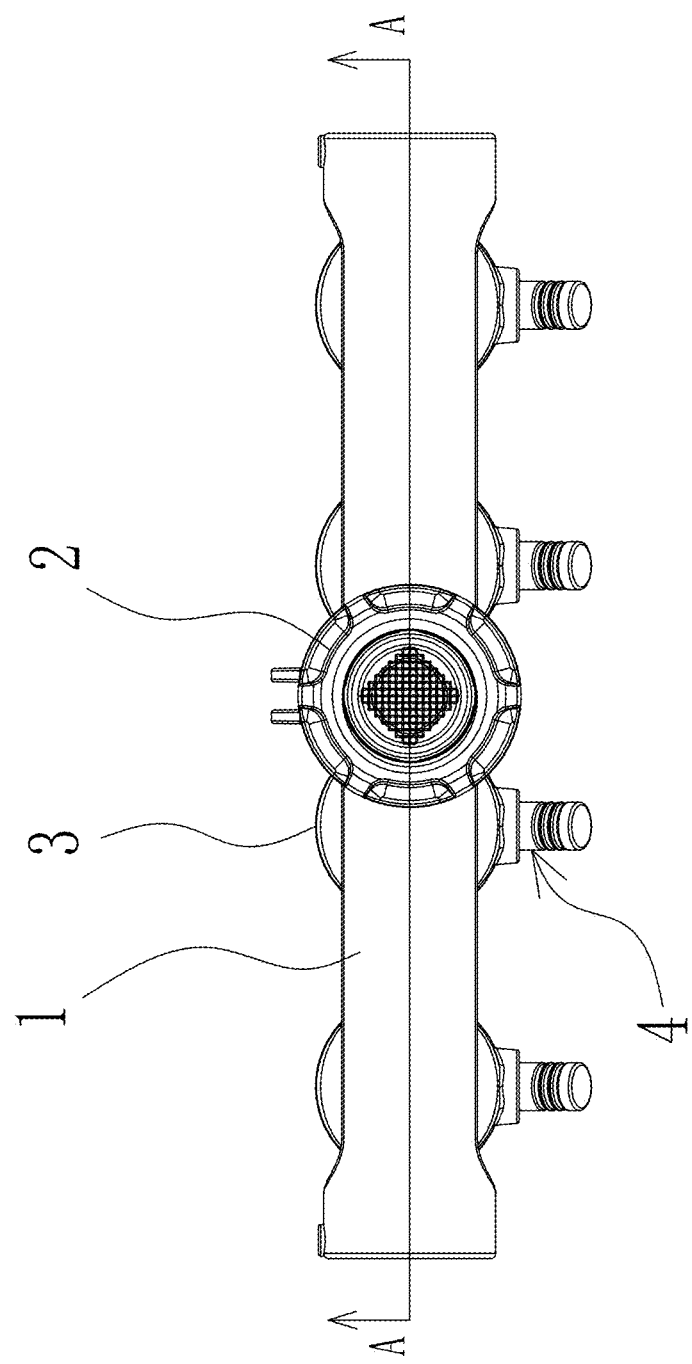
FIG. 3 is a top view of FIG. 1.
Figure 4:
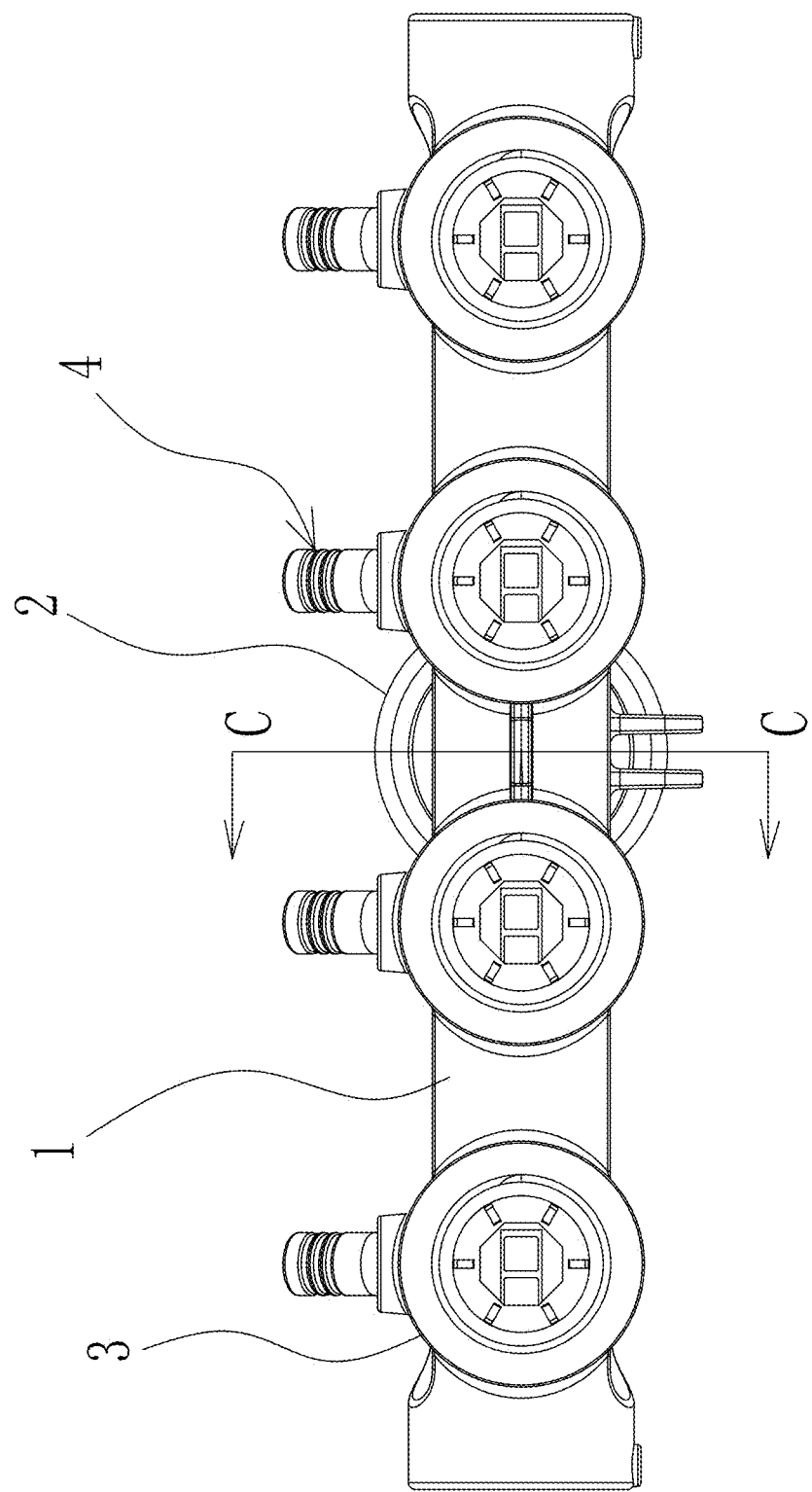
FIG. 4 is a bottom view of FIG. 1.

Each water outlet 3 of the present application is independently operated by the corresponding water flowing switch 4, during use, the pulling piece 45 on each water outlet 3 only needs to carry out front-back reciprocating pulling operation along the corresponding pulling groove 34, namely along the shaft axis of the water outlet 3, that is, the pulling piece 45 is pushed up or pulled down relative to FIG. 1 and FIG. 8, and thus, three service states including complete opening, complete closing or flow adjustment of each water outlet 3 are realized.

Since the water flowing switches 4 designed in the present application creatively adopts a switch blade type pulling operation mode to replace a traditional rotating mode or shifting mode, the advantages of labor saving in operation, convenience in pulling and the like are achieved, moreover, by the pulling structure, flow is easy to adjust, the user can master the operation state well, and the operation state recognition degree of the four-way water flowing structure is greatly increased.

The above description is only specific embodiments of the present application, and it should be understood by those skilled in the art that any structural design equivalent to the embodiments should be included within the scope of protection of the present application.

What is claimed is:

1. A switch blade type water flowing structure, comprising a main body, a main water channel arranged in the main body, as well as a water inlet and a plurality of water outlets arranged outside the main body and communicating with the main water channel, wherein a water flowing switch is arranged in the water outlet, the water flowing switch comprises a switch seat positioned and plugged in the corresponding water outlet in a sealed manner in the axial direction of the corresponding water outlet, and one side of the switch seat is provided with a switch piece being rotatably mounted in the switch seat in a sealed manner in the radial direction of the switch seat; the switch piece is provided with a pulling arm extending to the outside of the corresponding switch seat, and a pulling piece extending out and being exposed out of the outer surface of the corresponding water outlet is arranged on the pulling arm; and the pulling piece carries out front-back reciprocating pulling along a shaft axis of the corresponding water outlet, and drives the corresponding switch piece to rotate forwards and reversely in the corresponding switch seat so as to open and close the corresponding water outlet in a sealed manner or adjust the flow of the corresponding water outlet;

wherein the switch piece comprises a rotating head at the inner end, a pulling head at the outer end and a mandrel connected between the rotating head and the pulling head, and a sealing gasket being fixedly mounted is arranged on one side of the mandrel; a sealing ring is arranged on the outer circumferential surface of the rotating head, and a release stopping barb is arranged on the outer end surface of the rotating head; a sealing ring is arranged on the outer circumferential surface of the pulling head; and the pulling arm extends to the outside of the switch seat in an integrated manner from the outer end surface of the corresponding pulling head, and is parallel to a rotating shaft axis of the corresponding switch piece.

2. The switch blade type water flowing structure according to claim 1, wherein a water outlet channel penetrating through in the axial direction is formed in the switch seat, the inner end of the water outlet channel communicates with the main water channel, the outer end of the water outlet channel communicates to the outside of the corresponding water outlet, a shaft axis of the water outlet channel is superposed to the shaft axis of the corresponding water outlet, and the rotating shaft axis of the switch piece is perpendicular to the shaft axis of the corresponding water outlet channel.

3. The switch blade type water flowing structure according to claim 1, wherein a mounting hole penetrating through the corresponding water outlet channel in the radial direction is formed in one side of the switch seat, the switch piece is rotatably mounted in the corresponding mounting hole in a sealed manner, and the release stopping barb on the outer end surface of the rotating head is rotatably mounted in a release stopping manner; the sealing ring on the outer circumferential surface of the rotating head and the sealing ring on the outer circumferential surface of the pulling head are in contact with the inner wall of the opening of the corresponding mounting hole in a dynamic sealing manner, a water outlet hole is formed in a position where the mounting hole is connected with the corresponding water outlet channel, and the sealing gasket is pulled by the corresponding switch piece in a reciprocating manner to rotate so as to realize sealing opening and closing or flow adjustment with the corresponding water outlet hole.

4. The switch blade type water flowing structure according to claim 1, wherein the outer surface of the water outlet is provided with a pulling groove extending in the axial direction of the water outlet, and the pulling piece extends out of the corresponding pulling groove to be exposed.

5. The switch blade type water flowing structure according to claim 1, wherein the inner end of the switch seat is mounted in a neck hole of the corresponding water outlet in a sealed manner, an outer joint being mounted in a sealed manner is arranged at the outer end of the switch seat, and the outer joint is connected to the inside of the corresponding water outlet and seals the corresponding switch seat in the corresponding water outlet.

6. The switch blade type water flowing structure according to claim 1, wherein the outer surface of the switch seat is provided with a limiting rib as well as a positioning groove and a guiding groove penetrating through in the axial direction, and a limiting inclined plane cooperating with the corresponding limiting rib to implement installation limiting of the corresponding switch seat, a positioning rib cooperating with the corresponding positioning groove to implement installation positioning of the corresponding switch seat and a guiding rib cooperating with the corresponding guiding groove to implement installation guiding of the corresponding switch seat are arranged on the inner wall of the water outlet.

7. The switch blade type water flowing structure according to claim 1, wherein a water inlet plug is inserted in the water inlet in a sealed manner, a filter screen water stopping ring and a loose joint nut are arranged at the outer end of the water inlet plug, and a nut jacket wraps the outside of the loose joint nut.

8. The switch blade type water flowing structure according to claim 1, wherein the main body is a straight tube penetrating through in the axial direction, and a water stopping ring and an end cover are respectively arranged at the two ends of the straight tube for sealing.

9. The switch blade type water flowing structure according to claim 1, wherein the pulling piece is detachably connected with the corresponding pulling arm in a threaded manner.

* * * * *